US012696305B2

(12) United States Patent
Hao et al.

(10) Patent No.: US 12,696,305 B2
(45) Date of Patent: Jul. 28, 2026

(54) CROSS INTERFERENCE POSITIONING METHOD, BASE STATION, COLLABORATIVE APPARATUS, COMPUTER DEVICE, AND COMPUTER READABLE STORAGE MEDIUM

(71) Applicant: ZTE CORPORATION, Shenzhen (CN)

(72) Inventors: Yupeng Hao, Shenzhen (CN); Wenfang Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 256 days.

(21) Appl. No.: 18/720,628

(22) PCT Filed: Dec. 14, 2022

(86) PCT No.: PCT/CN2022/138980
§ 371 (c)(1),
(2) Date: Jun. 15, 2024

(87) PCT Pub. No.: WO2023/109860
PCT Pub. Date: Jun. 22, 2023

(65) Prior Publication Data
US 2025/0056592 A1      Feb. 13, 2025

(30) Foreign Application Priority Data
Dec. 16, 2021    (CN) .......................... 202111542878.4

(51) Int. Cl.
*H04W 72/541* (2023.01)
*H04B 17/309* (2015.01)
(Continued)

(52) U.S. Cl.
CPC ........ *H04W 72/541* (2023.01); *H04B 17/346* (2023.05); *H04W 72/0446* (2013.01); *H04W 72/0453* (2013.01)

(58) Field of Classification Search
None
See application file for complete search history.

(56) References Cited

U.S. PATENT DOCUMENTS 11,843,557 B2 * 12/2023 Cao ........................... H04J 11/00
2020/0169435 A1 * 5/2020 Kang .................. H04L 27/2607
(Continued)

FOREIGN PATENT DOCUMENTS

CN       101998415 A     3/2011
CN       102611525 A     7/2012
(Continued)

OTHER PUBLICATIONS

WIPO, International Search Report issued on Mar. 9, 2023.
(Continued)

*Primary Examiner* — Brian S Roberts
(74) *Attorney, Agent, or Firm* — Li & Cai Intellectual Property (USA) Office

(57) ABSTRACT

Provided is cross interference positioning method, in which collaborative apparatus sends feature signal transmission notification carrying resource location to each second base station being suspected interfering base station, according to pre-configured transmission order and transmission period of feature signal, so each second base station generates feature signal and send the same in downlink direction at resource location via each port thereof; collaborative apparatus also sends feature signal detection notice carrying resource location to first base station being suspected interfered base station, so first base station perform detection of feature signal at resource location. If first base station
(Continued)

receives, in uplink direction and at resource location, feature signal sent by second base station, second base station is determined as interfering base station corresponding to first base station. A base station, a collaborative apparatus, a computer device, and a computer readable storage medium are also provided.

20 Claims, 7 Drawing Sheets

(51) Int. Cl.
     *H04W 72/0446*      (2023.01)
     *H04W 72/0453*      (2023.01)

(56)                References Cited

U.S. PATENT DOCUMENTS

2020/0351065 A1 *  11/2020  Esswie .................. H04J 11/0056
2022/0104061 A1 *   3/2022  Abedini ............ H04W 28/0236

FOREIGN PATENT DOCUMENTS

| | | | |
|---|---|---|---|
| CN | 103391552 | A | 11/2013 |
| CN | 109040947 | A | 12/2018 |
| CN | 110012504 | A | 7/2019 |
| CN | 110324120 | A | 10/2019 |
| EP | 2665305 | A1 | 11/2013 |
| WO | WO 2016/192590 | A1 | 12/2016 |
| WO | WO 2018126792 | A1 | 7/2018 |
| WO | WO 2020/061721 | A1 | 4/2020 |

OTHER PUBLICATIONS

European Patent Office, the Extended European Search Report dated Nov. 10, 2025, for corresponding EP application No. 22906605.5.

ZTE: "Discussion on OAM functions to support RIM operation",3GPP Draft; R1-1900224 Discussion on OAM Functions to Support RIM Operation—Final, no. Taipei; Jan. 21, 2019-Jan. 25, 2019, Jan. 12, 2019 (Jan. 12, 2019).

China Patent Office, First Office Action dated Sep. 11, 2025, for corresponding CN application No. 202111542878.4.

China Patent Office, Search Report dated Sep. 5, 2025, for corresponding CN application No. 202111542878.4.

* cited by examiner

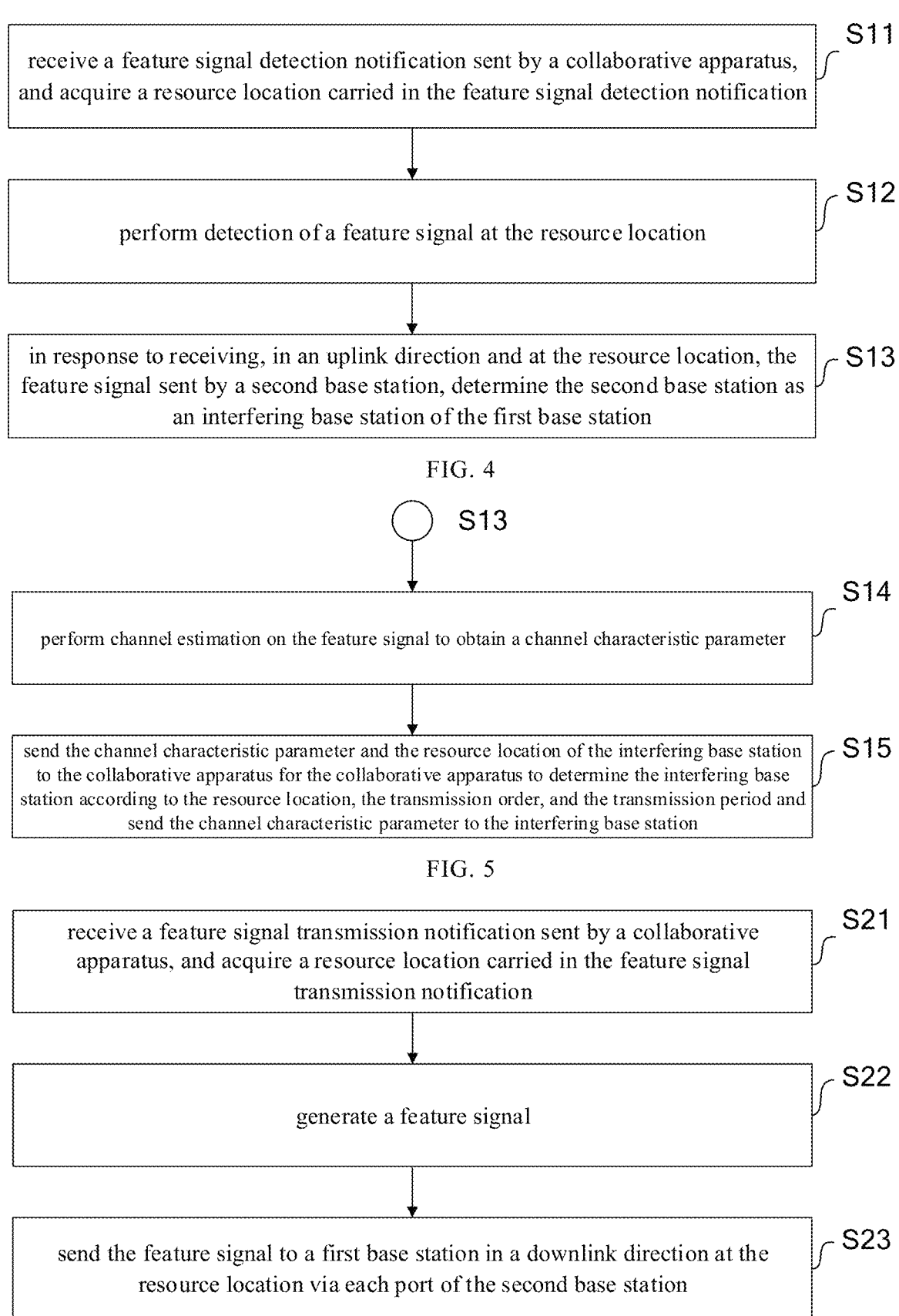

S11 receive a feature signal detection notification sent by a collaborative apparatus, and acquire a resource location carried in the feature signal detection notification

S12 perform detection of a feature signal at the resource location

S13 in response to receiving, in an uplink direction and at the resource location, the feature signal sent by a second base station, determine the second base station as an interfering base station of the first base station

S14 perform channel estimation on the feature signal to obtain a channel characteristic parameter

S15 send the channel characteristic parameter and the resource location of the interfering base station to the collaborative apparatus for the collaborative apparatus to determine the interfering base station according to the resource location, the transmission order, and the transmission period and send the channel characteristic parameter to the interfering base station

FIG. 5

S21 receive a feature signal transmission notification sent by a collaborative apparatus, and acquire a resource location carried in the feature signal transmission notification

S22 generate a feature signal

S23 send the feature signal to a first base station in a downlink direction at the resource location via each port of the second base station

FIG. 6

◯ S23 in response to receiving a channel characteristic parameter sent by the collaborative apparatus, correct a weight of a service UE beam of an interfering cell of the second base station according to the channel characteristic parameter to generate a beam nulling weight   S24 perform downlink joint beam nulling according to the beam nulling weight   S25

FIG. 7 receive signal power Ps sent by the collaborative apparatus, with the signal power Ps being signal power of the feature signal received by the first base station   S31 in response to receiving at least two pieces of signal power Ps, determine the interfered base station according to the signal power Ps, with the interfered base station being one of the first base stations   S32

FIG. 8 determine a time domain and a frequency domain corresponding to each port of the second base station according to a preset mapping relationship   S231 send the feature signal to the first base station in the downlink direction at the resource location via each port of the second base station according to the corresponding time domain and the corresponding frequency domain   S232

FIG. 9 according to the transmission order and the transmission period, send a feature signal transmission notification carrying the resource location to each second base station, with the feature signal transmission notification configured to instruct each second base station to generate a feature signal and send the feature signal in a downlink direction at the resource location via each port of the second base station   S41 send a feature signal detection notification carrying the resource location to the first base station, with the feature signal detection notification configured to instruct the first base station to perform detection of the feature signal at the resource location   S42

FIG. 10

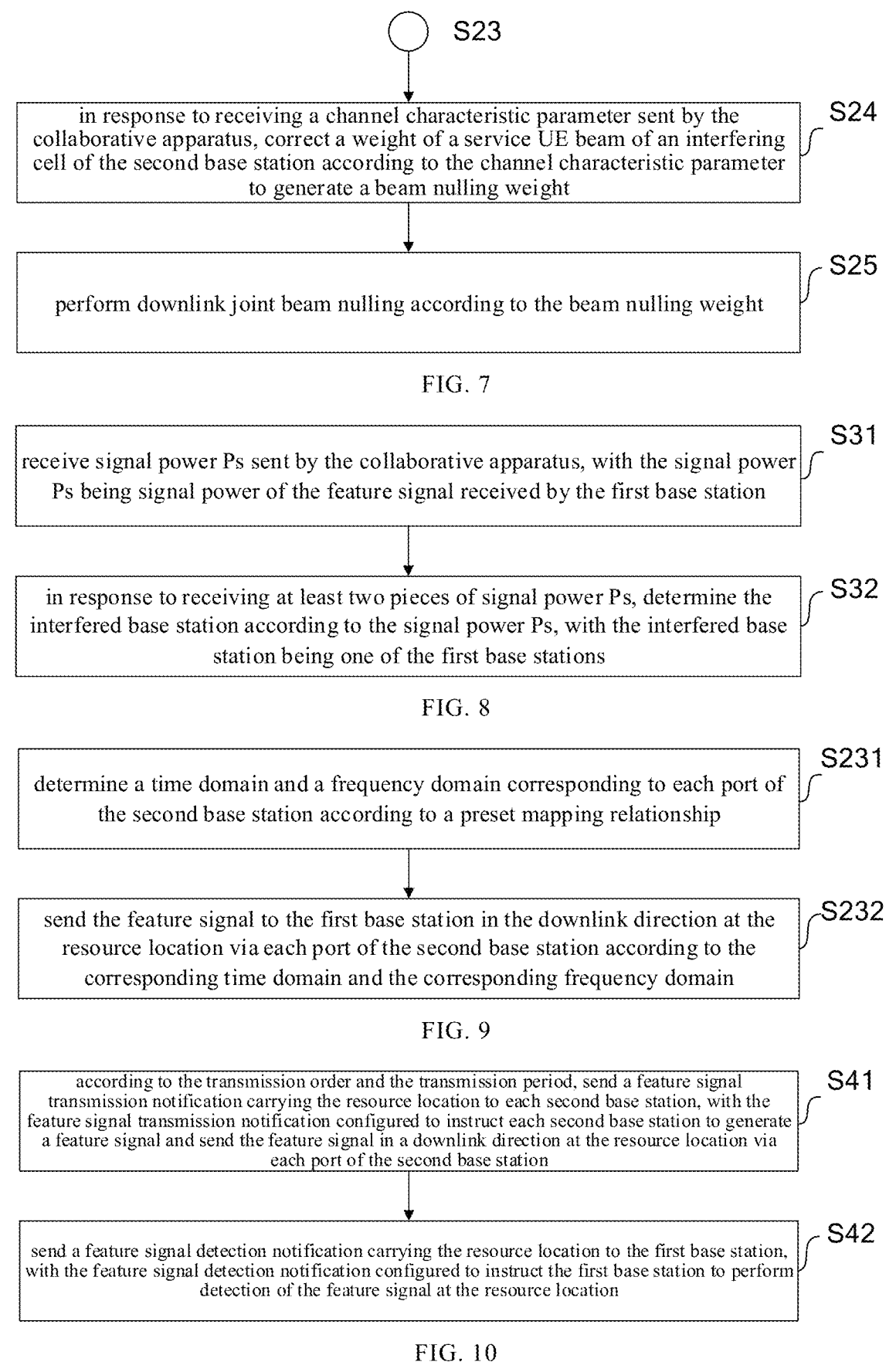

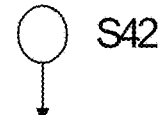 S42

S43 in response to receiving a channel characteristic parameter and the resource location sent by the first base station, determine an interfering base station according to the resource location, the transmission order, and the transmission period, and send the channel characteristic parameter to the interfering base station; and in response to receiving signal power sent by the first base station, send the signal power to the interfering base station, with the signal power being signal power of the feature signal received by the first base station

FIG. 11

| | | | | | |
|---|---|---|---|---|---|
| RE11 | p11 | p35 | p59 | p23 | p47 | |
| RE10 | p10 | p34 | p58 | p22 | p46 | |
| RE9 | p9 | p33 | p57 | p21 | p45 | |
| RE8 | p8 | p32 | p56 | p20 | p44 | |
| RE7 | p7 | p31 | p55 | p19 | p43 | |
| RE6 | p6 | p30 | p54 | p18 | p42 | |
| RE5 | p5 | p29 | p53 | p17 | p41 | |
| RE4 | p4 | p28 | p52 | p16 | p40 | |
| RE3 | p3 | p27 | p51 | p15 | p39 | p63 |
| RE2 | p2 | p26 | p50 | p14 | p38 | p62 |
| RE1 | p1 | p25 | p49 | p13 | p37 | p61 |
| RE0 | p0 | p24 | p48 | p12 | p36 | p60 |
| | | RB0 | | | RB1 | |

FIG. 12

| | | | | | | |
|---|---|---|---|---|---|---|
| RE11 | p19 | p11 | p51 | p27 | p39 | p63 |
| RE10 | p18 | p10 | p50 | p26 | p38 | p62 |
| RE9 | p64 | p9 | p49 | p64 | p37 | p61 |
| RE8 | p17 | p8 | p48 | p25 | p36 | p60 |
| RE7 | p16 | p7 | p47 | p24 | p35 | p59 |
| RE6 | p64 | p6 | p46 | p64 | p34 | p58 |
| RE5 | p15 | p5 | p45 | p23 | p33 | p57 |
| RE4 | p14 | p4 | p44 | p22 | p32 | p56 |
| RE3 | p64 | p3 | p43 | p64 | p31 | p55 |
| RE2 | p13 | p2 | p42 | p21 | p30 | p54 |
| RE1 | p12 | p1 | p41 | p20 | p29 | p53 |
| RE0 | p64 | p0 | p40 | p64 | p28 | p52 |
| | | RB0 | | | RB1 | |

FIG. 13

| | | | | | | | | | |
|---|---|---|---|---|---|---|---|---|---|
| RE11 | p44 | p46 | CDM11 | p21 | p23 | CDM5 | | | CDM17 |
| RE10 | p40 | p42 | CDM10 | p17 | p19 | CDM4 | | | CDM16 |
| RE9 | p36 | p38 | CDM9 | p13 | p15 | CDM3 | p61 | p63 | CDM15 |
| RE8 | p32 | p34 | CDM8 | p9 | p11 | CDM2 | p57 | p59 | CDM14 |
| RE7 | p28 | p30 | CDM7 | p5 | p7 | CDM1 | p53 | p55 | CDM13 |
| RE6 | p24 | p26 | CDM6 | p1 | p3 | CDM0 | p49 | p51 | CDM12 |
| RE5 | p20 | p22 | CDM5 | | | CDM17 | p45 | p47 | CDM11 |
| RE4 | p16 | p18 | CDM4 | | | CDM16 | p41 | p43 | CDM10 |
| RE3 | p12 | p14 | CDM3 | p60 | p62 | CDM15 | p37 | p39 | CDM9 |
| RE2 | p8 | p10 | CDM2 | p56 | p58 | CDM14 | p33 | p35 | CDM8 |
| RE1 | p4 | p6 | CDM1 | p52 | p54 | CDM13 | p29 | p31 | CDM7 |
| RE0 | p0 | p2 | CDM0 | p48 | p50 | CDM12 | p25 | p27 | CDM6 |
| | RB0 | | | RB1 | | | RB2 | | |

FIG. 14

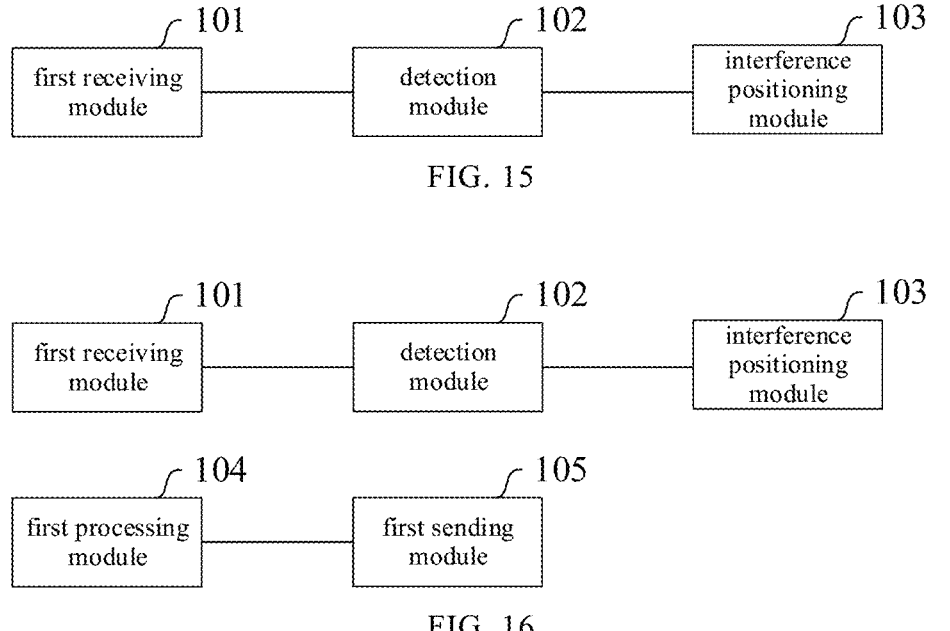

101 first receiving module — 102 detection module — 103 interference positioning module

FIG. 15

101 first receiving module — 102 detection module — 103 interference positioning module 104 first processing module — 105 first sending module

FIG. 16

CROSS INTERFERENCE POSITIONING METHOD, BASE STATION, COLLABORATIVE APPARATUS, COMPUTER DEVICE, AND COMPUTER READABLE STORAGE MEDIUM

CROSS-REFERENCE TO RELATED APPLICATIONS

The present disclosure is a National Phase Application filed under 35 U.S.C. 371 as a national stage of PCT/CN2022/138980, filed on Dec. 14, 2022 an application claiming claves the priority to Chinese Patent Application No. 202111542878.4 filed on Dec. 16, 2021, the contents of which are incorporated herein by reference in their entirety.

TECHNICAL FIELD

The present disclosure relates to the field of communication technology, and in particular, to a cross interference positioning method, a base station, a collaborative apparatus, a computer device, and a computer readable storage medium.

BACKGROUND

In a Time Division Duplexing (TDD) wireless system, some slots are downlink slots (D) for transmitting downlink signals, some slots are uplink slots (U) for receiving uplink signals, and some slots are special slots (S) used for uplink and downlink conversion. The special timeslots are generally classified into Downlink Pilot Time Slots (DwPTSs), Guard Periods (GPs), and Uplink Pilot Time Slots (UpPTSs). Requirements on uplink service bandwidths vary in different application scenarios, and increasing a proportion of uplink time domain resources (uplink slots and sub-frames) is the most direct way to increase the uplink service bandwidths. However, under the coexistence of different application scenarios, differences in configuration of frame structure may cause a problem that downlink signals from a base station in a neighboring cell interfere and collide with uplink reception of a base station in a local cell, thus generating relatively strong cross slot interference.

In an existing technology, a method of manually operating an interference detection instrument to analyze signals from an interfered system and an interfering system is adopted to detect whether cross slot interference exists in a base station in a TDD system, and when an interfering base station is detected, downlink transmit power of the interfering base station is manually reduced, or a downlink transmission slot of the interfering base station is manually changed. Such method is long in detection time and low in detection accuracy. Moreover, the method desires manual operation, resulting in low efficiency and poor repeatability, and causes a relatively large downlink loss of the interfering base station.

SUMMARY

In a first aspect, an embodiment of the present disclosure provides a cross interference positioning method applied to a first base station being a suspected interfered base station, including: receiving a feature signal detection notification sent by a collaborative apparatus, and acquiring a resource location carried in the feature signal detection notification, with the resource location including at least one of a time domain resource location or a frequency domain resource location; and performing detection of a feature signal at the resource location, and determining, in response to receiving, in an uplink direction and at the resource location, the feature signal sent by a second base station, the second base station as an interfering base station of the first base station; and the feature signal is generated by the second base station after receiving a feature signal transmission notification sent by the collaborative apparatus, and is sent in a downlink direction at the resource location via each port of the second base station, the feature signal transmission notification carries the resource location, and is sent to each second base station by the collaborative apparatus according to a transmission order and a transmission period, and the resource location, the transmission order, and the transmission period are pre-configured in the collaborative apparatus for each second base station; and the second base station is a suspected interfering base station corresponding to the first base station.

In another aspect, an embodiment of the present disclosure further provides a cross interference positioning method applied to a second base station being a suspected interfering base station, including: receiving a feature signal transmission notification sent by a collaborative apparatus, and acquiring a resource location carried in the feature signal transmission notification, with the resource location including at least one of a time domain resource location or a frequency domain resource location; the feature signal transmission notification is sent to each second base station by the collaborative apparatus according to a transmission order and a transmission period, and the resource location, the transmission order, and the transmission period are pre-configured in the collaborative apparatus for each second base station; and generating a feature signal, and sending the feature signal to a first base station in a downlink direction at the resource location via each port of the second base station, with the first base station being a suspected interfered base station corresponding to the second base station.

In still another aspect, an embodiment of the present disclosure further provides a cross interference positioning method applied to a collaborative apparatus configured therein with a first base station, a plurality of second base stations, and a resource location, a transmission order, and a transmission period of a feature signal for each of the second base stations, the resource location including at least one a time domain resource location or a frequency domain resource location, the first base station being a suspected interfered base station, the second base stations being suspected interfering base stations corresponding to the first base station, and the method including: according to the transmission order and the transmission period, sending a feature signal transmission notification carrying the resource location to each of the second base stations, with the feature signal transmission notification configured to instruct each of the second base stations to generate a feature signal and send the feature signal in a downlink direction at the resource location via each port of each of the second base stations; and sending a feature signal detection notification carrying the resource location to the first base station, with the feature signal detection notification configured to instruct the first base station to perform detection of the feature signal at the resource location.

In yet another aspect, an embodiment of the present disclosure further provides a base station, which is a first base station being a suspected interfered base station, including a first receiving module, a detection module, and an interference positioning module; the first receiving module is configured to receive a feature signal detection notification sent by a collaborative apparatus, and acquire a resource location carried in the feature signal detection notification, and the resource location includes at least one of a time domain resource location or a frequency domain resource location; the detection module is configured to perform detection of a feature signal at the resource location; and the interference positioning module is configured to determine, in response to receiving, in an uplink direction and at the resource location, the feature signal sent by a second base station, the second base station as an interfering base station of the first base station; the feature signal is generated by the second base station after receiving a feature signal transmission notification sent by the collaborative apparatus, and is sent in a downlink direction at the resource location via each port of the second base station, the feature signal transmission notification carries the resource location, and is sent to each second base station by the collaborative apparatus according to a transmission order and a transmission period, and the resource location, the transmission order, and the transmission period are pre-configured in the collaborative apparatus for each second base station; and the second base station is a suspected interfering base station corresponding to the first base station.

In yet another aspect, an embodiment of the present disclosure further provides a base station, which is a second base station being a suspected interfering base station, including a second receiving module, a first generation module, and a second sending module; the second receiving module is configured to receive a feature signal transmission notification sent by a collaborative apparatus, and acquire a resource location carried in the feature signal transmission notification, and the resource location includes at least one of a time domain resource location or a frequency domain resource location; and the feature signal transmission notification is sent to each second base station by the collaborative apparatus according to a transmission order and a transmission period, and the resource location, the transmission order, and the transmission period are pre-configured in the collaborative apparatus for each second base station; the first generation module is configured to generate a feature signal; and the second sending module is configured to send the feature signal to a first base station in a downlink direction at the resource location via each port of the second base station, with the first base station being a suspected interfered base station corresponding to the second base station.

In yet another aspect, an embodiment of the present disclosure further provides a collaborative apparatus, which is configured with a first base station, a plurality of second base stations, and a resource location, a transmission order, and a transmission period of a feature signal for each of the second base stations, wherein the resource location includes at least one a time domain resource location or a frequency domain resource location, the first base station is a suspected interfered base station, and the second base stations are suspected interfering base stations corresponding to the first base station; the collaborative apparatus includes a first notification module and a second notification module, the first notification module is configured to send, according to the transmission order and the transmission period, a feature signal transmission notification carrying the resource location to each of the second base stations, with the feature signal transmission notification configured to instruct each of the second base stations to generate a feature signal and send the feature signal in a downlink direction at the resource location via each port of each of the second base stations; and the second notification module is configured to send a feature signal detection notification carrying the resource location to the first base station, with the feature signal detection notification configured to instruct the first base station to perform detection of the feature signal at the resource location.

In yet another aspect, an embodiment of the present disclosure further provides a computer device, including: at least one processor; and a storage device having at least one computer program stored thereon; and when the at least one computer program is executed by the at least one processor, the at least one processor is caused to implement the cross interference positioning method described above.

In yet another aspect, an embodiment of the present disclosure further provides a computer readable storage medium having stored thereon a computer program which, when being executed, implements the cross interference positioning method described above.

BRIEF DESCRIPTION OF DRAWINGS

FIG. 4 is a flowchart illustrating a cross interference positioning method applied to a first base station according to an embodiment of the present disclosure;

FIG. 5 is a flowchart illustrating a cross interference positioning method applied to a first base station according to an embodiment of the present disclosure;

FIG. 6 is a flowchart illustrating a cross interference positioning method applied to a second base station according to an embodiment of the present disclosure;

FIG. 7 is a flowchart illustrating a cross interference positioning method applied to a second base station according to an embodiment of the present disclosure;

FIG. 8 is a flowchart of determining an interfered base station according to an embodiment of the present disclosure;

FIG. 9 is a flowchart of sending, by a second base station, a feature signal via each port thereof according to an embodiment of the present disclosure;

FIG. 10 is a flowchart illustrating a cross interference positioning method applied to a collaborative apparatus according to an embodiment of the present disclosure;

FIG. 11 is a flowchart illustrating a cross interference positioning method applied to a collaborative apparatus according to an embodiment of the present disclosure;

FIG. 12 is a schematic diagram of a mapping relationship among ports of a base station, time domains, and frequency domains in First Example of the present disclosure;

FIG. 13 is a schematic diagram of a mapping relationship among ports of a base station, time domains, and frequency domains in Second Example of the present disclosure;

FIG. 14 is a schematic diagram of a mapping relationship among ports of a base station, Code Division Multiplexing (CDM) groups, time domains, and frequency domains in Third Example of the present disclosure;

FIG. 15 to FIG. 17 are schematic structural diagrams of a first base station according to an embodiment of the present disclosure;

FIG. 18 to FIG. 20 are schematic structural diagrams of a second base station according to an embodiment of the present disclosure.

DETAIL DESCRIPTION OF EMBODIMENTS

Figures 1, 2, 3:
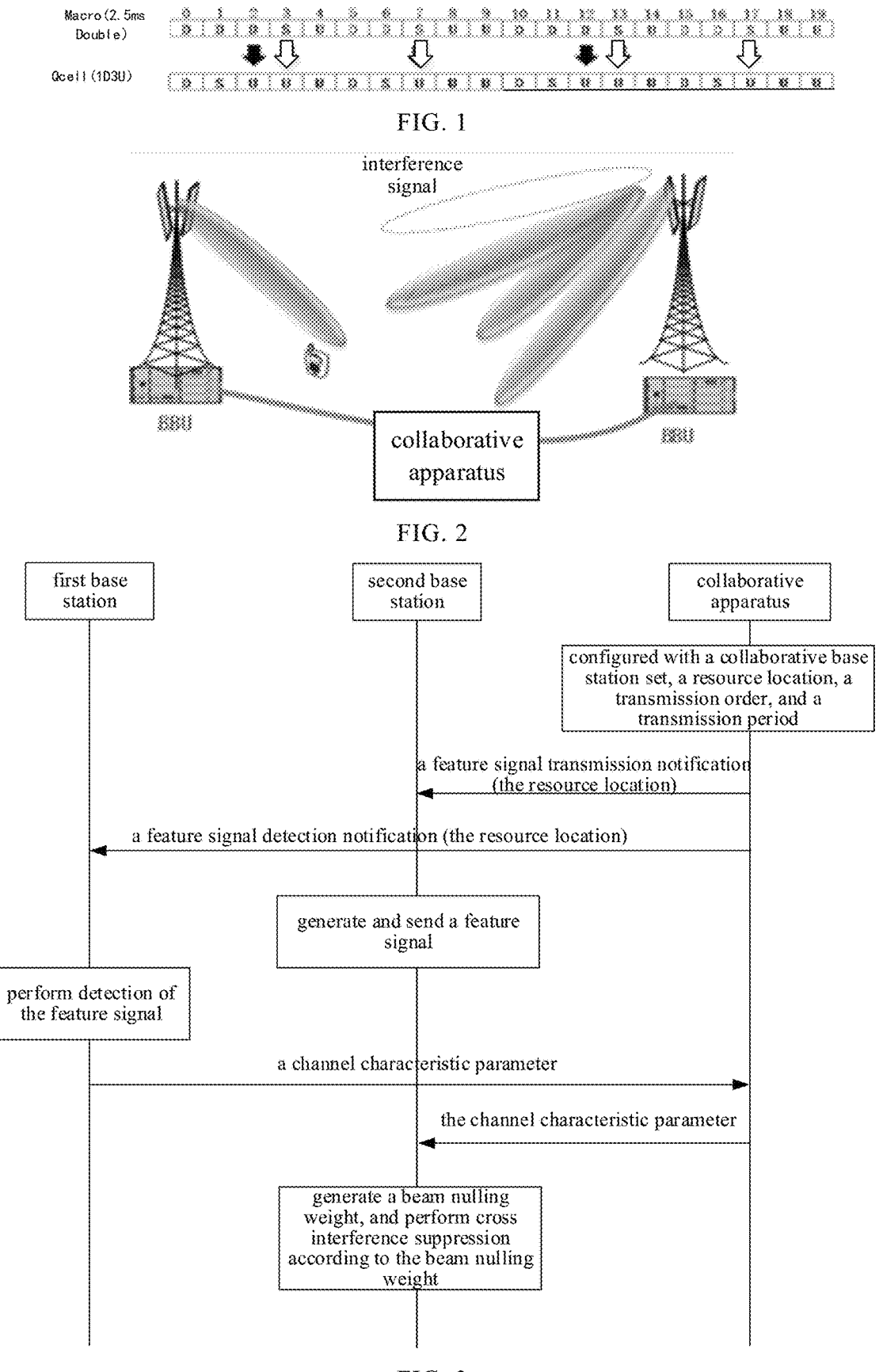
FIG. 1 is a schematic diagram illustrating cross interference of different frame structures in a TDD wireless system according to an embodiment of the present disclosure.
FIG. 2 is a schematic diagram of a system architecture according to an embodiment of the present disclosure.
FIG. 3 is a schematic diagram illustrating an overall process of a cross interference positioning method according to an embodiment of the present disclosure.

Exemplary embodiments will be described more fully below with reference to the drawings, but the exemplary embodiments may be embodied in different forms to illustrate the present disclosure, and the present disclosure should not be interpreted as being limited to the embodiments described herein. The embodiments are provided to make the present disclosure thorough and complete, and are intended to enable those of ordinary skill in the art to fully understand the scope of the present disclosure.

The term "and/or" used herein includes any and all combinations of one or more associated listed items.

The terms used herein are merely used to describe exemplary embodiments, and do not limit the present disclosure. As used herein, "a" and "the" which indicate a singular form also include a plural form, unless expressly stated in the context. It should be further understood that the term(s) "include" and/or "be made of" used herein indicate(s) the presence of the described features, integers, operations, elements and/or components, but do not exclude the presence or addition of one or more other features, integers, operations, elements, components and/or combinations thereof.

The embodiments described herein can be described with reference to plans and/or cross-sectional views with the aid of idealized schematic diagrams of the present disclosure. Accordingly, the exemplary drawings may be modified according to manufacturing techniques and/or tolerances. Therefore, the embodiments are not limited to those illustrated by the drawings, but include modifications to configuration formed based on a manufacturing process. Thus, regions shown in the drawings are illustrative, and shapes of the regions shown in the drawings illustrate specific shapes of regions of elements, but are not intended to make limitations.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

The cross interference refers to interference of a downlink signal to uplink reception which is caused in a case where a base station in a neighboring cell performs the uplink reception at a moment of a base station sending the downlink signal.

FIG. 1 shows a scenario where different frame structures coexist in an existing network of an operator, a macro station (Macro) adopts a frame structure of 7D3U, and a micro station (Qcell) adopts a frame structure of 1D3U. It is found through tests that uplink slots (U) of 1D3U of the micro station are subjected to strong interference by downlink signals in the frame structure of 7D3U of the macro station as indicated by the black arrows and the white arrows in FIG. 1. When an interference signal from the macro station is increased by 3 decibels (dB) relative to a background noise, an uplink traffic loss of the interfered micro station is more than 10%; and when the interference signal from the macro station is increased by 10 dB relative to the background noise, the uplink traffic loss of the interfered micro station is more than 25%. In practical applications, the interference of the downlink signals of the macro station to uplink signals of the micro station uplink can reach 20 dB or more, which greatly affects the uplink signals of the micro station. Therefore, a solution to reduce the interference of the downlink signals of the macro station to the uplink signals of the micro station is desired to improve uplink performance of the micro station.

In addition, in an out-of-synchronism scenario of a clock of a base station, downlink signals from the out-of-synchronism base station also interfere with uplink reception of a neighboring base station.

The present disclosure provides a cross interference positioning scheme applied to a system shown in FIG. 2. As shown in FIG. 2, the system includes a first base station (a suspected interfered base station), a second base station (a suspected interfering base station), and a collaborative apparatus. FIG. 3 is a schematic diagram illustrating an overall process of a cross interference positioning method according to the present disclosure. As shown in FIG. 2 and FIG. 3, the collaborative apparatus is pre-configured with a collaborative base station set, which includes the first base station and the second base station, the second base station is a suspected interfering base station corresponding to the first base station, and the first base station is a suspected interfered base station corresponding to the second base station. The collaborative apparatus is further configured, for each second base station, with a resource location, a transmission order, and a transmission period of a feature signal. The collaborative apparatus is configured to send a feature signal transmission notification carrying the resource location to each second base station according to the transmission order and the transmission period, and send a feature signal detection notification carrying the resource location to the first base station. The second base station is configured to generate the feature signal, and send the feature signal to the first base station in a downlink direction at the resource location via a plurality of air interfaces. The first base station is configured to detect whether the feature signal sent by the second base station is received at the resource location, and determine, if the feature signal is received at the resource location, that the second base station is an interfering base station of the first base station; and the first base station is further configured to calculate a channel characteristic parameter, and transfer the channel characteristic parameter to the interfering base station through the collaborative apparatus. The second base station, which is determined as the interfering base station of the first base station, is configured to generate a beam nulling weight according to the channel characteristic parameter and perform cross interference suppression according to the beam nulling weight. The collaborative apparatus may be an independent device such as an EdgeQos AI platform, or may be a functional module integrated on a base station, for example, the collaborative apparatus may be a CC board or a computer board (Node Engine).

As shown in FIG. 4, a cross interference positioning method according to an embodiment of the present disclosure is applied to a first base station, which is a suspected interfered base station, and the method includes the following operations S11 to S13.

At operation S11, a feature signal detection notification sent by a collaborative apparatus is received, and a resource location carried in the feature signal detection notification is acquired.

The resource location includes a time domain resource location and/or a frequency domain resource location, and the time domain resource location may be a slot location of a radio frame.

At operation S12, detection of a feature signal is performed at the resource location.

The feature signal is generated by a second base station after receiving a feature signal transmission notification sent by the collaborative apparatus, and is sent in a downlink direction at the resource location via each port of the second base station. The feature signal transmission notification carries the resource location, and is sent to each second base station by the collaborative apparatus according to a transmission order and a transmission period, and the resource location, the transmission order, and the transmission period are pre-configured in the collaborative apparatus for each second base station. According to the transmission orders, all second base stations periodically send, in turn, different feature signals via a plurality of ports according to the transmission periods, that is, all the second base stations periodically send the respective feature signals in a time-division manner, and for each second base station, the feature signal is simultaneously sent via different ports.

At operation S13, in response to receiving, in an uplink direction and at the resource location, the feature signal sent by the second base station, the second base station is determined as an interfering base station of the first base station.

The second base station is a suspected interfering base station corresponding to the first base station. It should be noted that the collaborative apparatus is pre-configured with a collaborative base station set, which includes the first base station and the second base station, each of the number of first base stations and the number of second base stations may be one or more, and the collaborative apparatus informs each base station in the collaborative base station set of the collaborative base station set.

After the second base station sends the feature signal in the downlink direction, the first base station performs detection of the feature signal at the resource location. If the feature signal is normally detected, it is indicated that the second base station which sends the feature signal at the moment is the interfering base station. It should be noted that, in order to ensure alignment of starting positions of radio frames, during the process of sending, receiving, and detecting the feature signal, the first base station and the second base station are desired to perform synchronous detection, for example, synchronous detection may be achieved based on the feature signal or downlink primary/secondary synchronization information.

According to the cross interference positioning method provided by the present disclosure, the collaborative apparatus sends the feature signal transmission notification carrying the resource location to each second base station (the suspected interfering base station) according to the pre-configured transmission order and transmission period of the feature signal, so that each second base station can generate the feature signal and send the feature signal in the downlink direction at the resource location via each port; the collaborative apparatus also sends the feature signal detection notice carrying the resource location to the first base station (the suspected interfered base station), so that the first base station can perform detection of the feature signal at the resource location; if the first base station receives, in the uplink direction and at the resource location, the feature signal sent by the second base station, the second base station can be determined as the interfering base station corresponding to the first base station, thus achieving cross interference positioning. Based on the collaboration between the suspected interfering base station and the suspected interfered base station, self-adaptive cross interference positioning is realized through measurement of the air-interface feature signal. The cross interference positioning method provided by the present disclosure has the advantages of high flexibility, easy implementation, and high interference positioning precision, and can alleviate the interference at the interfered side with the minimum loss of the interfering side.

In some implementations, as shown in FIG. 5, after determining the second base station as the interfering base station of the first base station (i.e., operation S13), the cross interference positioning method may further include the following operations S14 and S15:

operation S14, performing channel estimation on the feature signal to obtain a channel characteristic parameter; and operation S15, sending the channel characteristic parameter and the resource location of the interfering base station to the collaborative apparatus for the collaborative apparatus to determine the interfering base station according to the resource location, the transmission order, and the transmission period and send the channel characteristic parameter to the interfering base station.

At operation S15, the first base station sends the channel characteristic parameter corresponding to the received feature signal to the collaborative apparatus via an inter-station system interface (which may be an Xn interface, an X2 interface, or an Xc interface), and then the collaborative apparatus forwards the channel characteristic parameter to the interfering base station (which is determined at operation S13 and is one of a plurality of second base stations), so as to enable the interfering base station to further suppress cross interference according to the channel characteristic parameter.

In some implementations, in a case where the number of second base stations is more than one, determining the second base station as the interfering base station of the first base station in response to receiving, in the uplink direction and at the resource location, the feature signal sent by the second base station (i.e., operation S13) includes: in response to receiving feature signals sent by the plurality of second base stations, determining the interfering base station of the first base station from the second base stations according to signal power Ps of each feature signal. At this operation, the first base station selects the feature signal with the maximum signal power Ps, and determines the second base station which sends the feature signal with the maximum signal power Ps as the interfering base station of the first base station (such second base station causes the maximum cross interference to the first base station).

In some implementations, after determining the second base station as the interfering base station of the first base station (i.e., operation S13), the cross interference positioning method further includes: sending the signal power Ps of the feature signal sent by the interfering base station to the collaborative apparatus for the collaborative apparatus to send the signal power Ps to the interfering base station. In a case where the number of first base stations is more than one, it is desired to determine on which interfered base station the cross interference suppression is to be performed, which accordingly desires determining the interfered base station (which is one of the plurality of first base stations) according to the signal power Ps. Therefore, each of the first base stations sends the signal power Ps of the received feature signal to the interfering base station through the collaborative apparatus for the interfering base station to select and determine the interfered base station.

In some implementations, receiving, in the uplink direction and at the resource location, the feature signal sent by the second base station includes: receiving, in the uplink direction and at the resource location, the feature signal sent by the second base station, with the signal power Ps of the feature signal being greater than a first threshold; or, receiving, in the uplink direction and at the resource location, the feature signal sent by the second base station, with a signal-to-interference plus noise ratio SINR of the feature signal being greater than a second threshold.

In some implementations, each port of the second base station is in one-to-one correspondence with each antenna of the second base station. Illustratively, the second base station includes p ports, p is the number of antennas of the second base station, and the p ports of the second base station are in one-to-one correspondence with the p antennas of the second base station.

In some implementations, the number of ports of the second base station is equal to the number of antennas of the second base station plus 1. The second base station includes first ports and one second port, each first port is in one-to-one correspondence with each antenna of the second base station, and the second port corresponds to a plurality of antennas of the second base station, that is, the second port is multiplexed by some antennas that may be those fixed to not perform channel shutdown.

In the case where the second base station is provided with the second port, in order to simplify complexity of cross interference positioning, before performing detection of the feature signal at the resource location (i.e., operation S12), the cross interference positioning method further includes: performing confidence decision on the second port, and performing, in response to passing the confidence decision, detection of the feature signal at the resource location; or determining, in response to not passing the confidence decision, that the feature signal is not detected currently and detection of the feature signal is not performed at the resource location subsequently.

In order to improve reliability, ensure a detection effect of the feature signal, and prolong a detection period, for a same port at the side of the second base station, the second base station may send the feature signal at least two times at different time domain resource locations. In order to simplify the complexity of cross interference positioning and increase an interference positioning speed, at the side of the first base station, detection is merely performed on the feature signal sent for one of the at least two times by the second base station, and it is determined that the feature signal is detected when the first base station detects the feature signal sent for either of the at least two times.

Accordingly, in some implementations, the resource location includes a first resource location and a second resource location, a time domain resource location in the first resource location precedes a time domain resource location in the second resource location, and performing detection of the feature signal at the resource location includes: performing detection of the feature signal at the second resource location.

An embodiment of the present disclosure further provides a cross interference positioning method applied to a second base station, which is a suspected interfering base station. As shown in FIG. 6, the cross interference positioning method includes operations S21 to S23.

At operation S21, a feature signal transmission notification sent by a collaborative apparatus is received, and a resource location carried in the feature signal transmission notification is acquired.

The feature signal transmission notification is sent to each second base station by the collaborative apparatus according to a transmission order and a transmission period, and the resource location, the transmission order, and the transmission period are pre-configured in the collaborative apparatus for each second base station. The resource location includes a time domain resource location and/or a frequency domain resource location, and the time domain resource location may be a slot location of a radio frame.

At operation S22, a feature signal is generated.

It should be noted that feature signals generated at different ports of the second base station are different.

The feature signal is a signal sequence with a certain length, and the length of the feature signal is derived from a total number of Resource Blocks (RBs) and a minimum granularity RB number of the feature signal.

In some implementations, the feature signal may be defined as follows:

$$r(m) = \frac{1}{\sqrt{2}}(1 - 2 \cdot c(2m)) + j\frac{1}{\sqrt{2}}(1 - 2 \cdot c(2m+1)),$$

where c is a pseudo-random sequence, $C_{init} = 2^{10}(1+1)$, $C_{init}$ is an initial value of c, and 1 is a symbol index of the feature signal and takes values staring from 0; m is a frequency-domain-sequence Resource Element (RE) index of the feature signal and takes values staring from 0, and j is an imaginary part of a complex number.

With reference to the TS38.211 protocol, the generation of a pseudo-random sequence c(i) is defined as follows:

$$c(n) = (x_1(n+N_C) + x_2(n+N_C)) \bmod 2$$

$$x_1(n+31) = (x_1(n+3) + x_1(n)) \bmod 2,$$

$$x_2(n+31) = (x_2(n+3) + x_2(n+2) + x_2(n+1) + x_2(n)) \bmod 2$$

where $M_{PN}$ is a length of a sequence c(n); n=0, 1, . . . , $M_{PN}-1$; and $N_C$=1600. $x_1(n)$ is initialized to obtain $x_1(0)=1$, $x_1(n)=0$, n=1, 2, . . . , 30. $x_2(n)$ is initialized to obtain $$c_{init} = \sum_{i=0}^{30} x_2(i) \cdot 2^i.$$

At operation S23, the feature signal is sent to a first base station in a downlink direction at the resource location via each port of the second base station.

The first base station is a suspected interfered base station corresponding to the second base station.

According to the cross interference positioning method provided by the present disclosure, the collaborative apparatus sends the feature signal transmission notification carrying the resource location to each second base station (the suspected interfering base station) according to the pre-configured transmission order and transmission period of the feature signal, so that each second base station can generate the feature signal and send the feature signal in the downlink direction at the resource location via each port thereof; the collaborative apparatus also sends a feature signal detection notice carrying the resource location to the first base station (the suspected interfered base station), so that the first base station can perform detection of the feature signal at the resource location; if the first base station receives, in an uplink direction and at the resource location, the feature signal sent by the second base station, the second base station can be determined as the interfering base station corresponding to the first base station, thus achieving cross interference positioning. Based on the collaboration between the suspected interfering base station and the suspected interfered base station, self-adaptive cross interference positioning is realized through measurement of the air-interface feature signal. The cross interference positioning method provided by the present disclosure has the advantages of high flexibility, easy implementation, and high interference positioning precision, and can alleviate the interference at the interfered side with the minimum loss of the interfering side.

In some implementations, as shown in FIG. 7, after sending the feature signal to the first base station in the downlink direction at the resource location (i.e., operation S23), the cross interference positioning method may further include the following operations S24 and S25.

At operation S24, in response to receiving a channel characteristic parameter sent by the collaborative apparatus, a weight of a service User Equipment (UE) beam of an interfering cell of the second base station is corrected according to the channel characteristic parameter to generate a beam nulling weight.

At this operation, the second base station generates the beam nulling weight according to the service UE beam of the interfering cell together with the channel characteristic parameter fed back by the interfered base station.

At operation S25, downlink joint beam nulling is performed according to the beam nulling weight.

Through operations S24 and S25, cross interference suppression can be realized, and can suppress uplink interference to the interfered base station to the greatest extent while reducing a loss of the interfering base station.

In a case where there are a plurality of interfered base stations, the interfering base station is desired to determine one interfered base station (the one interfered base station is a base station subjected to the most serious cross interference among the first base stations), and perform interference suppression on the one interfered base station. Accordingly, as shown in FIG. 8, after sending the feature signal to the first base station in the downlink direction at the resource location (i.e., operation S23), the cross interference positioning method may further include the following operations S31 and S32.

At operation S31, signal power Ps sent by the collaborative apparatus is received, with the signal power Ps being signal power of the feature signal received by the first base station.

After receiving the feature signal, the first base station detects the signal power Ps of the feature signal, and sends the signal power Ps to the interfering base station (which is one of a plurality of second base stations) through the collaborative apparatus.

At operation S32, in response to receiving at least two pieces of signal power Ps, the interfered base station is determined according to the signal power Ps, with the interfered base station is one of the first base stations.

In the case where there are a plurality of suspected interfered base stations (i.e., the first base stations), each first base station sends the signal power Ps of the received feature signal to the interfering base station through the collaborative apparatus, the interfering base station selects the maximum signal power from the received signal power Ps, and the first base station corresponding to the maximum signal power is the interfered base station.

After the interfered base station is determined, correspondingly, correcting, in response to receiving the channel characteristic parameter sent by the collaborative apparatus, the weight of the service UE beam of the interfering cell of the second base station according to the channel characteristic parameter to generate the beam nulling weight (i.e., operation S24) includes: in response to receiving at least two channel characteristic parameters sent by the collaborative apparatus, determining the channel characteristic parameter used for interference suppression from the at least two channel characteristic parameters, with the channel characteristic parameter used for interference suppression being the channel characteristic parameter sent by the interfered base station through the collaborative apparatus; and correcting the weight of the service UE beam of the interfering cell of the second base station according to the channel characteristic parameter used for interference suppression to generate the beam nulling weight. That is, the interfering base station selects the channel characteristic parameter (i.e., the channel characteristic parameter used for interference suppression) fed back by the interfered base station from a plurality of received channel characteristic parameters, and performs interference suppression according to the selected channel characteristic parameter.

In some implementations, as shown in FIG. 9, sending the feature signal to the first base station in the downlink direction at the resource location via each port of the second base station (i.e., operation S23) includes the following operations S231 and S232:

operation S231, determining a time domain and a frequency domain corresponding to each port of the second base station according to a preset mapping relationship; and operation S232, sending the feature signal to the first base station in the downlink direction at the resource location via each port of the second base station according to the corresponding time domain and the corresponding frequency domain.

In order to improve reliability, ensure a detection effect of the feature signal, and prolong a detection period, for a same port at the side of the second base station, the second base station may send the feature signal at least twice at different time domain resource locations. Therefore, in some implementations, the resource location includes a first resource location and a second resource location, and accordingly, sending the feature signal to the first base station in the downlink direction at the resource location (i.e., operation S232) includes: respectively sending the feature signal to the first base station in the downlink direction at the first resource location and at the second resource location.

In some implementations, the number of ports of the second base station is equal to the number of antennas of the second base station, and each port of the second base station is in one-to-one correspondence with each antenna of the second base station.

In some implementations, the number of ports of the second base station is equal to the number of antennas of the second base station plus 1. The second base station includes first ports and one second port, each first port is in one-toone correspondence with each antenna of the second base station, and the second port corresponds to a plurality of antennas of the second base station, that is, the second port is multiplexed by some antennas that may be those fixed to not perform channel shutdown. Illustratively, the second base station is provided with sixty-four antennas, the number of ports of the second base station is sixty-five, the sixty-four first ports (p0 to p63) are in one to one correspondence with the sixty-four antennas, and the one second port (p64) may be corresponding to a plurality of antennas.

In some implementations, the mapping relationship includes a first mapping relationship or a second mapping relationship, the first mapping relationship is a mapping relationship among ports of the second base station, time domains, and frequency domains, and the second mapping relationship is a mapping relationship among the ports of the second base station, CDM groups, the time domains, and the frequency domains. A CDM group can multiplex time domain resources of a channel and can also multiplex frequency domain resources of the channel. With the introduction of the CDM groups, the number of occupied REs for sending the feature signal can be reduced.

In some implementations, the feature signal includes a Pseudo-Noise (PN) sequence or a Zadoff-Chu (ZC) sequence. It should be noted that the feature signal may be other signal sequences.

The present disclosure further provides a cross interference positioning method applied to a collaborative apparatus, which is configured therein with a first base station, a plurality of second base stations, and a resource location, a transmission order, and a transmission period of a feature signal for each second base station. The resource location includes at least one a time domain resource location or a frequency domain resource location, the first base station is a suspected interfered base station, and the second base stations are suspected interfering base stations corresponding to the first base station. As shown in FIG. 10, the cross interference positioning method includes the following operations S41 and S42:

operation S41, according to the transmission order and the transmission period, sending a feature signal transmission notification carrying the resource location to each second base station, with the feature signal transmission notification configured to instruct each second base station to generate a feature signal and send the feature signal in a downlink direction at the resource location via each port of the second base station; and operation S42, sending a feature signal detection notification carrying the resource location to the first base station, with the feature signal detection notification configured to instruct the first base station to perform detection of the feature signal at the resource location.

According to the cross interference positioning method provided by the present disclosure, the collaborative apparatus sends the feature signal transmission notification carrying the resource location to each second base station (the suspected interfering base station) according to the pre-configured transmission order and transmission period of the feature signal, so that each second base station can generate the feature signal and send the feature signal in the downlink direction at the resource location via each port thereof; the collaborative apparatus also sends the feature signal detection notice carrying the resource location to the first base station (the suspected interfered base station), so that the first base station can perform detection of the feature signal at the resource location; if the first base station receives, in the uplink direction and at the resource location, the feature signal sent by the second base station, the second base station can be determined as the interfering base station corresponding to the first base station, thus achieving cross interference positioning. Based on the collaboration between the suspected interfering base station and the suspected interfered base station, self-adaptive cross interference positioning is realized through measurement of the air-interface feature signal. The cross interference positioning method provided by the present disclosure has the advantages of high flexibility, easy implementation, and high interference positioning precision, and can alleviate the interference at the interfered side with the minimum loss of the interfering side.

In some implementations, as shown in FIG. 11, after sending the feature signal detection notification carrying the resource location to the first base station (i.e., operation S42), the cross interference positioning method may further include the following operation S43:

operation S43, in response to receiving a channel characteristic parameter and the resource location sent by the first base station, determining an interfering base station according to the resource location, the transmission order, and the transmission period, and sending the channel characteristic parameter to the interfering base station; and in response to receiving signal power sent by the first base station, sending the signal power to the interfering base station, with the signal power being signal power of the feature signal received by the first base station.

Since the collaborative apparatus is pre-configured with the resource location, the transmission order, and the transmission period, at this operation, the collaborative apparatus may determine the second base station, which is the interfering base station, corresponding to the resource location, and send the received channel characteristic parameter to the interfering base station for the interfering base station to perform cross interference suppression.

In order to clearly explain the technical solutions provided in the embodiments of the present disclosure, a description is given below with reference to three examples. In all the three examples, a case where the downlink signals of the macro station interfere with the uplink signals of the micro station illustrated in FIG. 1 is taken as an example, with the macro station being the second base station and the micro station being the first base station.

First Example

The collaborative apparatus uniformly numbers macro stations from 0, and assuming that the total number of the macro stations is X, then X∈{0, . . . , X−1}. The collaborative apparatus is provided with a timer. After the timer expires, using the feature signal transmission notification, the collaborative apparatus periodically informs, via an Xn interface, the corresponding macro stations in turn according to the numbering order of the macro stations to send the feature signals in a slot Slot7 via a plurality ports.

The feature signal adopts the PN sequence, and the time domain resource location (a symbol position) of the feature signal may be the last few symbols in Slot7, which causes the minimum resource loss.

A frequency domain of the feature signal may adopt full bandwidth mapping or partial bandwidth mapping.

It is assumed that the macro station is provided with sixty-four antennas, and the feature signal may be respectively sent via sixty-four ports of the macro station.

In a case where the frequency domain of the feature signal adopts a full bandwidth mapping mode, a 2RB3 symbol is taken as the minimum granularity, and assuming that the total number of RBs is $N_{RB}$, then frequency domain RB mapping satisfies the following relation:

$$N_{RB} \bmod 2 = \begin{cases} 0, \text{ mapping from } RB0, \text{ with the full bandwidth occupied} \\ 1, \text{ mapping from } RB1, \text{ with one empty } RB \text{ left at the head} \end{cases}$$

The sixty-four antennas are in one-to-one correspondence with the sixty-four ports. FIG. 12 shows the mapping relationship among the ports (p0 to p63) of the macro station, the time domains, and the frequency domains. In FIG. 12, one RB includes twelve consecutive sub-carriers REs (RE0 to RE11), and each RE corresponds to a respective one port.

Using the feature signal detection notification, the collaborative apparatus informs the micro station to perform detection of the feature signal in Slot7. If receiving the feature signal sent by the macro station, the micro station acquires the signal power Ps of the feature signal, calculates the channel characteristic parameter, and sends the channel characteristic parameter and Slot7 to the collaborative apparatus. The collaborative apparatus may determine which macro station interferes with the micro station according to the time domain location (i.e., Slot7) of the feature signal detected by the micro station and the numbering sequence of the macro stations, and feed back the channel characteristic parameter of the feature signal detected by the micro station to the corresponding macro station via an Xn interface. The macro station performs downlink beam nulling according to the service UE beam of a local cell together with the channel characteristic parameter fed back by the micro station, so as to suppress the interference of the downlink signals of the macro station to the uplink signals of the micro station.

Second Example

The collaborative apparatus uniformly numbers macro stations from 1, and assuming that the total number of the macro stations is X, then $X \in \{1, \ldots, X\}$. The collaborative apparatus is provided with a timer. After the timer expires, using the feature signal transmission notification, the collaborative apparatus periodically informs, via an Xc interface, the corresponding macro stations in turn according to the numbering order of the macro stations to send the feature signals in slots Slot7 and Slot27 via a plurality ports.

The feature signal adopts the PN sequence, and the time domain resource location (a symbol position) of the feature signal may be the last few symbols in each of Slot7 and Slot27, which causes the minimum resource loss.

A frequency domain of the feature signal adopts a full bandwidth mapping mode, and a 2RB3 symbol is taken as the minimum granularity. Assuming that the total number of RBs is $N_{RB}$, then frequency domain RB mapping satisfies the following relation:

$$N_{RB} \bmod 2 = \begin{cases} 0, \text{ mapping from } RB0, \text{ with the full bandwidth occupied} \\ 1, \text{ mapping from } RB0, \text{ with one empty } RB \text{ left at the tail} \end{cases}$$

It is assumed that the macro station is provided with sixty-four antennas and includes sixty-four ports (p0 to p63), and the sixty-four antennas are in one-to-one correspondence with the sixty-four ports. In order to perform largescale Timing Advance (TA) estimation, a $65^{th}$ port (p64) is further provided, a signal from the port p64 is sent through some of the sixty-four antennas, such as the antennas fixed not to perform channel shutdown, power of each RE corresponding to p64 is equal to that of each RE corresponding to the other ports. FIG. 13 shows the mapping relationship between the sixty-five ports of the macro station, the time domains, and the frequency domains. In FIG. 13, one RB includes twelve consecutive subcarriers REs (RE0 to RE11), and each RE corresponds to a respective one port. The mapping relationship shown in FIG. 13 in the Second Example differs from the mapping relationship shown in FIG. 12 in the First Example in that: the port p64 of the macro station in the Second Example is multiplexed by some antennas, while no port of the macro station in the First Example is multiplexed by the antennas.

Time domain mapping of the feature signal adopts a method of sending twice at corresponding time domain symbol positions of different radio frames, such time domain transmission method is different from a method of adding a Cyclic Prefix (CP) to a common OFDM symbol, and reference needs to be made to a method of sending two consecutive symbols defined by RIM-RS in the TS 38.211 protocol for such time domain transmission method. By adopting such time domain transmission method, it can be ensured that the micro station receives at least one complete feature symbol, and the phenomenon that the detection performed by the micro station fails because the collaborative apparatus cannot acquire an accurate symbol starting position of the feature signal received by the micro station can be avoided.

The micro station selects the feature signal sent for the second time by each symbol for detection. That is, assuming that six time domain symbols of the feature signal sent by the macro station are [Sym0' Sym0 Sym1' Sym1 Sym2' Sym2], with Sym0', Sym1', and Sym2' denoting symbol locations in Slot7 where the feature signal is carried, and Sym0, Sym1, and Sym2 denoting symbol locations in Slot27 where the feature signal is carried, then the micro station selects Sym0, Sym1, and Sym2 in Slot27 through which the feature signal is sent for the second time to perform detection. In order to simplify complexity and increase a response speed of interference positioning, as long as the micro station detects the feature signal sent for any one of the two times by the macro station in Slot7 and Slot27, it is determined that the feature signal is detected.

In order to simplify the complexity, the micro station may first perform confidence decision using the port p64. When a confidence level passes the confidence decision, it is determined that the feature signal is detected, and then it is respectively detected whether the feature signal is received via the first ports (p0 to p63); and when the confidence level does not pass the confidence decision, it is determined that the feature signal is not detected currently, and detection of whether the feature signal is received via the first ports (p0 to p63) is not performed. The micro station acquires the signal power Ps, the signal-to-interference plus noise ratio SINR, and the channel characteristic parameter of the feature signal; when the SINR is greater than a certain threshold, it is determined that the confidence level passes the confidence decision, that is, it is determined that the feature signal is detected; and when the SINR is smaller than the certain threshold, it is determined that the confidence level does not pass the confidence decision, that is, the feature signal is not detected.

The collaborative apparatus may determine which macro station interferes with the micro station according to the time domain location of the feature signal detected by the micro station and the numbering rule of the macro stations, and feeds back the signal power Ps and the channel characteristic parameter of the feature signal detected by the micro station to the corresponding macro station via an Xc interface. In a case where there are a plurality of suspected interfered micro stations, the macro station sorts the signal power Ps fed back by the plurality of micro stations, selects the micro station corresponding to the maximum signal power Ps as the interfered micro station, and performs downlink beam nulling according to the service UE beam of a local cell and the channel characteristic parameter fed back by the interfered micro station, so as to suppress the interference of the downlink signals of the macro station to the uplink signals of the interfered micro station.

Third Example

The Third Example differs from the First Example in that: the frequency domain resource mapping of the feature signal adopts a mode in which the minimum granularity is 3RB*2 symbols.

The feature signal adopts a full bandwidth mapping mode, and every three RBs are taken as a group. Assuming that the total number of RBs is $N_{RB}$, then frequency domain RB mapping satisfies the following relation:

$$N_{RB}\bmod 3 = \begin{cases} 0, & \text{mapping from } RB0, \quad \text{with the full bandwidth occupied} \\ 1, & \text{mapping from } RB0, \quad \text{with one empty } RB \text{ left at the tail} \\ 2, & \text{mapping from } RB1, \quad \text{with one empty } RB \text{ left at the head} \\ & \qquad\qquad\qquad\qquad\qquad\quad \text{and one empty } RB \text{ left at the tail} \end{cases}$$

Sixty-four ports (p0 to p63) within the three RBs are mapped in the form of CDM groups, and each CDM group corresponds to two frequency-domain REs and two time-domain symbols.

Each CDM group maps four ports, that is, CDM4-FD2-TD2, and a corresponding relationship between frequency-domain Orthogonal Cover Codes (OCCs) and time-domain OCC indexes is shown in Table 1.

TABLE 1

| OCC Index | $[w_f(0)\ w_f(1)]$ | $[w_t(0)\ w_t(1)]$ |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

For a port p, a corresponding CDM group index is $CDM\_ind = \lfloor p/4 \rfloor \bmod 18$, and a corresponding OCC index within the CDM group is $OCC\_ind = p \bmod 4$.

FIG. 14 shows a mapping relationship among each port of the macro station within one CDM group, the CDM groups, the time domains, and the frequency domains.

In FIG. 14, one column denotes one symbol, one CDM group includes three RBs, one RB includes twelve consecutive subcarriers REs (RE0 to RE11) and two symbols, and each RE corresponds to a respective one port.

A cross interference positioning process and a cross interference suppression process in the Third Example are the same as those in the First Example, and thus are not repeated here.

The cross interference positioning method provided by the present disclosure can be applied to a scenario of coexistence of different frame structures, and can also be applied to an out-of-synchronism station or a frame header offset scenario. Under the coexistence of different co-frequency frame structures, co-frequency networking is inevitably desired, relative strong cross slot interference may be caused in the scenario of the mixed frame structures, an interference source needs to be positioned, and an interference avoidance measure needs to be automatically started. In the frame header offset scenario, there are different frame offset requirements for different frequency bands due to inter-system coexistence and carrier aggregation, so that the problem that advanced areas of frame headers are not uniform is caused, resulting in cross interference. By adopting the cross interference positioning and suppression scheme provided by the present disclosure, the cross interference problems in the above scenarios can be solved.

With the cross interference positioning method provided by the present disclosure, the interference source can be accurately and automatically positioned, self-adaptive collaboration can be realized to trigger beam-level nulling avoidance at the side of the interference source, and the interference of the interference source to the interfered side can be reduced to the greatest extent, thereby improving the network performance of the interfered side. Compared with other interference alleviation and avoidance techniques, the scheme provided by the present disclosure adopts a self-adaptive policy, has the advantages of high flexibility, easy implementation, high interference positioning precision, and stable interference suppression effect, and can alleviate the interference to the interfered side while ensuring the minimum loss of the interfering side, thereby maximizing a total benefit.

Based on the same technical concept, an embodiment of the present disclosure further provides a base station, and the base station is a first base station which is a suspected interfered base station. As shown in FIG. 15, the base station includes a first receiving module 101, a detection module 102, and an interference positioning module 103.

The first receiving module 101 is configured to receive a feature signal detection notification sent by a collaborative apparatus, and acquire a resource location carried in the feature signal detection notification, with the resource location including at least one of a time domain resource location or a frequency domain resource location.

The detection module 102 is configured to perform detection of a feature signal at the resource location.

The interference positioning module 103 is configured to determine, in response to receiving, in an uplink direction and at the resource location, the feature signal sent by a second base station, the second base station as an interfering base station of the first base station.

The feature signal is generated by the second base station after receiving a feature signal transmission notification sent by the collaborative apparatus, and is sent in a downlink direction at the resource location via each port of the second base station. The feature signal transmission notification carries the resource location, and is sent to each second base station by the collaborative apparatus according to a transmission order and a transmission period, and the resource location, the transmission order, and the transmission period are pre-configured in the collaborative apparatus for each second base station. The second base station is a suspected interfering base station corresponding to the first base station.

In some implementations, as shown in FIG. 16, the base station further includes a first processing module 104 and a first sending module 105.

The first processing module 104 is configured to perform channel estimation on the feature signal to obtain a channel characteristic parameter after the interference positioning module 103 determines the second base station as the interfering base station of the first base station.

The first sending module 105 is configured to send the channel characteristic parameter and the resource location of the interfering base station to the collaborative apparatus for the collaborative apparatus to determine the interfering base station according to the resource location, the transmission order, and the transmission period and send the channel characteristic parameter to the interfering base station.

In some implementations, the interference positioning module 103 is configured to determine, in response to receiving feature signals sent by a plurality of second base stations, the interfering base station of the first base station from the second base stations according to signal power of each feature signal.

In some implementations, the first sending module 105 is further configured to send, after the interference positioning module 103 determines the second base station as the interfering base station of the first base station, the signal power of the feature signal sent by the interfering base station to the collaborative apparatus for the collaborative apparatus to send the signal power to the interfering base station.

In some implementations, the detection module 102 is configured to determine that the feature signal sent by the second base station is received in the uplink direction at the resource location when the feature signal sent by the second base station is received in the uplink direction at the resource location and the signal power of the feature signal is greater than a first threshold, or when the feature signal sent by the second base station is received in the uplink direction at the resource location and a signal-to-interference plus noise ratio of the feature signal is greater than a second threshold.

In some implementations, the number of ports of the second base station is equal to the number of antennas of the second base station plus 1. The second base station includes first ports and one second port, each first port is in one-to-one correspondence with each antenna of the second base station, and the second port corresponds to a plurality of antennas of the second base station.

Figures 17, 18, 19:
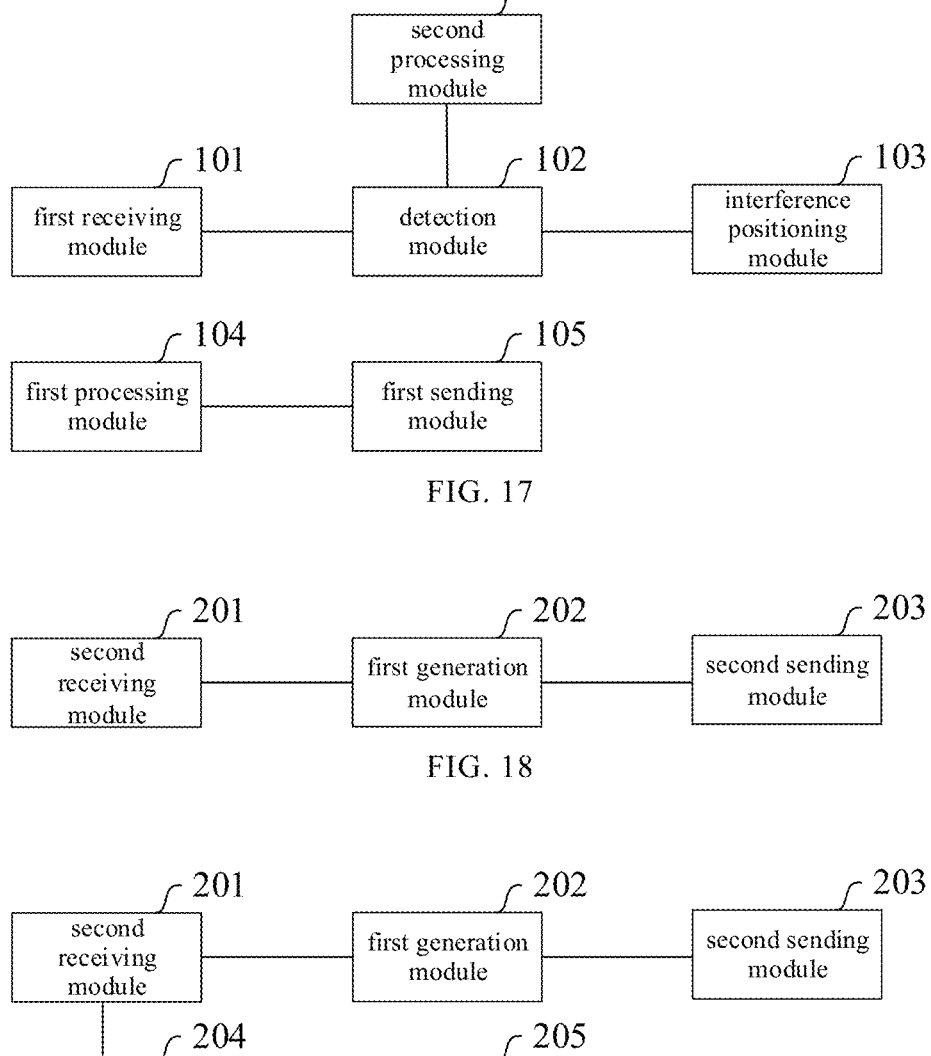

As shown in FIG. 17, the base station further includes a second processing module 106.

The second processing module 106 is configured to perform confidence decision on the second port before performing detection of the feature signal at the resource location, and perform, in response to passing the confidence decision, detection of the feature signal at the resource location, or determine, in response to not passing the confidence decision, that detection of the feature signal is not performed at the resource location.

In some implementations, the resource location includes a first resource location and a second resource location, a time domain resource location in the first resource location precedes a time domain resource location in the second resource location, and the detection module 102 is configured to perform detection of the feature signal at the second resource location.

Based on the same technical concept, an embodiment of the present disclosure further provides a base station, and the base station is a second base station which is a suspected interfering base station. As shown in FIG. 18, the base station includes a second receiving module 201, a first generation module 202, and a second sending module 203.

The second receiving module 201 is configured to receive a feature signal transmission notification sent by a collaborative apparatus, and acquire a resource location carried in the feature signal transmission notification, with the resource location including at least one of a time domain resource location or a frequency domain resource location. The feature signal transmission notification is sent to each second base station by the collaborative apparatus according to a transmission order and a transmission period, and the resource location, the transmission order, and the transmission period are pre-configured in the collaborative apparatus for each second base station.

The first generation module 202 is configured to generate a feature signal.

The second sending module 203 is configured to send the feature signal to a first base station in a downlink direction at the resource location via each port of the second base station, with the first base station being a suspected interfered base station corresponding to the second base station.

In some implementations, as shown in FIG. 19, the base station further includes a second generation module 204 and an interference suppression module 205.

The second generation module 204 is configured to correct, in response to receiving a channel characteristic parameter sent by the collaborative apparatus, a weight of a service UE beam of an interfering cell of the second base station according to the channel characteristic parameter to generate a beam nulling weight.

The interference suppression module 205 is configured to perform downlink joint beam nulling according to the beam nulling weight.

Figure 20:
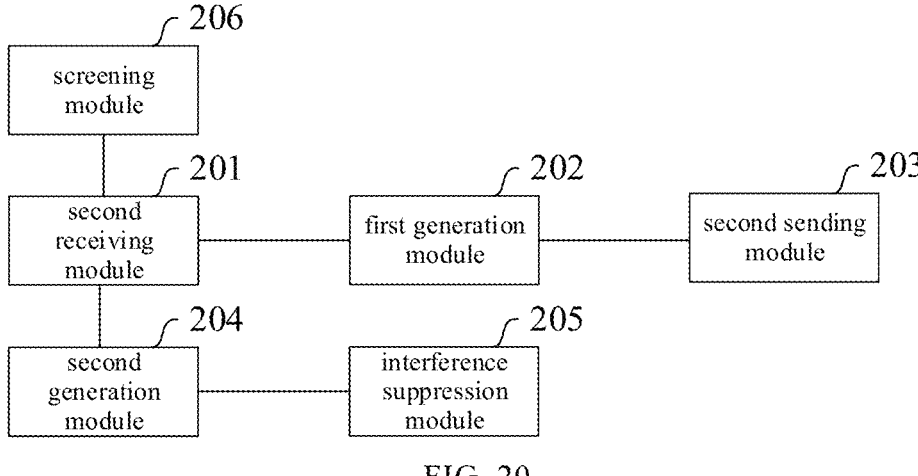

In some implementations, as shown in FIG. 20, the base station further includes a screening module 206, and the second receiving module 201 is further configured to receive signal power sent by the collaborative apparatus, with the signal power being signal power of the feature signal received by the first base station.

The screening module 206 is configured to determine, in response to receiving at least two pieces of signal power, an interfered base station according to the signal power, with the interfered base station being one of first base stations.

The second generation module 204 is configured to determine, in response to receiving at least two channel characteristic parameters sent by the collaborative apparatus, the channel characteristic parameter used for interference suppression from the at least two channel characteristic parameters, with the channel characteristic parameter used for interference suppression being the channel characteristic parameter sent by the interfered base station through the collaborative apparatus. The second generation module 204 is further configured to correct the weight of the service UE beam of the interfering cell of the second base station according to the channel characteristic parameter used for interference suppression to generate the beam nulling weight.

In some implementations, the second sending module 203 is configured to determine a time domain and a frequency domain corresponding to each port of the second base station according to a preset mapping relationship, and send the feature signal to the first base station in the downlink direction at the resource location via each port of the second base station according to the corresponding time domain and the corresponding frequency domain.

In some implementations, the resource location includes a first resource location and a second resource location, and the second sending module 203 is configured to respectively send the feature signal to the first base station in the downlink direction at the first resource location and at the second resource location.

In some implementations, the number of ports of the second base station is equal to the number of antennas of the second base station, and each port of the second base station is in one-to-one correspondence with each antenna of the second base station; or, the number of ports of the second base station is equal to the number of antennas of the second base station plus 1, the second base station includes first ports and one second port, each first port is in one-to-one correspondence with each antenna of the second base station, and the second port corresponds to a plurality of antennas of the second base station.

In some implementations, the mapping relationship includes a first mapping relationship or a second mapping relationship, the first mapping relationship is a mapping relationship among ports of the second base station, time domains, and frequency domains, and the second mapping relationship is a mapping relationship among the ports of the second base station, CDM groups, the time domains, and the frequency domains.

In some implementations, the feature signal includes a PN sequence or a ZC sequence.

Figure 21:
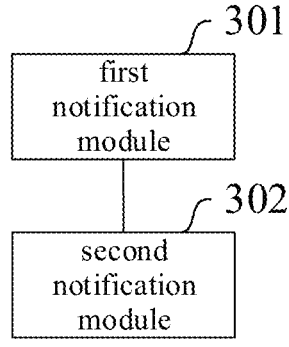
FIG. 21 and FIG. 22 are schematic structural diagrams of a collaborative apparatus according to an embodiment of the present disclosure.

Based on the same technical concept, the present disclosure further provides a collaborative apparatus, which is configured therein with a first base station, a plurality of second base stations, and a resource location, a transmission order, and a transmission period of a feature signal for each second base station. The resource location includes at least one a time domain resource location or a frequency domain resource location, the first base station is a suspected interfered base station, and the second base stations are suspected interfering base stations corresponding to the first base station. As shown in FIG. 21, the collaborative apparatus includes a first notification module 301 and a second notification module 302.

The first notification module 301 is configured to send, according to the transmission order and the transmission period, a feature signal transmission notification carrying the resource location to each second base station, with the feature signal transmission notification configured to instruct each second base station to generate a feature signal and send the feature signal in a downlink direction at the resource location via each port of the second base station.

The second notification module 302 is configured to send a feature signal detection notification carrying the resource location to the first base station, with the feature signal detection notification configured to instruct the first base station to perform detection of the feature signal at the resource location.

Figure 22:
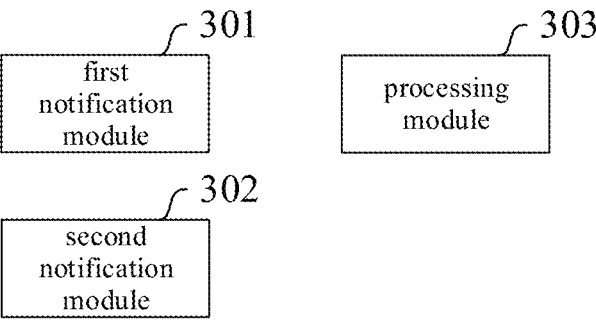

In some implementations, as shown in FIG. 22, the collaborative apparatus further includes a processing module 303.

The processing module 303 is configured to determine, in response to receiving a channel characteristic parameter and the resource location sent by the first base station, an interfering base station according to the resource location, the transmission order, and the transmission period, and send the channel characteristic parameter to the interfering base station. The processing module 303 is further configured to send, in response to receiving signal power sent by the first base station, the signal power to the interfering base station, with the signal power being signal power of the feature signal received by the first base station.

The present disclosure further provides a computer device, including: at least one processor and a storage device; and the storage device has at least one computer program stored thereon, and when the at least one computer program is executed by the at least one processor, the at least one one processor is caused to implement the cross interference positioning method described above.

An embodiment of the present disclosure further provides a computer readable storage medium having stored thereon a computer program which, when being executed, implements the cross interference positioning method described above.

It should be understood by those of ordinary skill in the art that the functional modules/units in all or some of the operations and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. A cross interference positioning method applied to a first base station being a suspected interfered base station, comprising:

receiving a feature signal detection notification sent by a collaborative apparatus, and acquiring a resource location carried in the feature signal detection notification, with the resource location comprising at least one of a time domain resource location or a frequency domain resource location; and performing detection of a feature signal at the resource location, and determining, in response to receiving, in an uplink direction and at the resource location, the feature signal sent by a second base station, the second base station as an interfering base station of the first base station;

wherein the feature signal is generated by the second base station after receiving a feature signal transmission notification sent by the collaborative apparatus, and is sent in a downlink direction at the resource location via each port of the second base station, the feature signal transmission notification carries the resource location, and is sent to each second base station by the collaborative apparatus according to a transmission order and a transmission period, and the resource location, the transmission order, and the transmission period are pre-configured in the collaborative apparatus for each second base station; and the second base station is a suspected interfering base station corresponding to the first base station.

2. The method of claim 1, further comprising:

after determining the second base station as the interfering base station of the first base station, performing channel estimation on the feature signal to obtain a channel characteristic parameter; and sending the channel characteristic parameter and the resource location of the interfering base station to the collaborative apparatus for the collaborative apparatus to determine the interfering base station according to the resource location, the transmission order, and the transmission period and send the channel characteristic parameter to the interfering base station.

3. The method of claim 1, wherein a number of second base stations is more than one, and determining, in response to receiving, in the uplink direction and at the resource location, the feature signal sent by the second base station, the second base station as the interfering base station of the first base station comprises:

in response to receiving feature signals sent by a plurality of second base stations, determining the interfering base station of the first base station from the plurality of second base stations according to signal power of each of the feature signals.

4. The method of claim 3, further comprising:

after determining the second base station as the interfering base station of the first base station, sending the signal power of the feature signal sent by the interfering base station to the collaborative apparatus for the collaborative apparatus to send the signal power to the interfering base station.

5. The method of claim 1, wherein receiving, in the uplink direction and at the resource location, the feature signal sent by the second base station comprises:

receiving, in the uplink direction and at the resource location, the feature signal sent by the second base station, with signal power of the feature signal being greater than a first threshold; or, receiving, in the uplink direction and at the resource location, the feature signal sent by the second base station, with a signal-to-interference plus noise ratio of the feature signal being greater than a second threshold.

6. The method of claim 1, wherein a number of ports of the second base station is equal to a number of antennas of the second base station plus 1, the second base station comprises first ports and one second port, the first ports are in one-to-one correspondence with the antennas of the second base station, and the second port corresponds to a plurality of antennas of the second base station; and the method further comprises:

performing confidence decision on the second port before performing detection of the feature signal at the resource location, and performing, in response to passing the confidence decision, detection of the feature signal at the resource location, or determining, in response to not passing the confidence decision, that detection of the feature signal is not performed at the resource location.

7. The method of claim 1, wherein the resource location comprises a first resource location and a second resource location, a time domain resource location in the first resource location precedes a time domain resource location in the second resource location, and performing detection of the feature signal at the resource location comprises: performing detection of the feature signal at the second resource location.

8. A base station, comprising:

at least one processor; and a storage device having at least one computer program stored thereon;

when the at least one computer program is executed by the at least one processor, the at least one processor is caused to implement the cross interference positioning method of claim 1.

9. A cross interference positioning method applied to a second base station being a suspected interfering base station, comprising:

receiving a feature signal transmission notification sent by a collaborative apparatus, and acquiring a resource location carried in the feature signal transmission notification, with the resource location comprising at least one of a time domain resource location or a frequency domain resource location; wherein the feature signal transmission notification is sent to each second base station by the collaborative apparatus according to a transmission order and a transmission period, and the resource location, the transmission order, and the transmission period are pre-configured in the collaborative apparatus for each second base station; and generating a feature signal, and sending the feature signal to a first base station in a downlink direction at the resource location via each port of the second base station, with the first base station being a suspected interfered base station corresponding to the second base station.

10. The method of claim 9, further comprising:

after sending the feature signal to the first base station in the downlink direction at the resource location, correcting, in response to receiving a channel characteristic parameter sent by the collaborative apparatus, a weight of a service User Equipment beam of an interfering cell of the second base station according to the channel characteristic parameter to generate a beam nulling weight; and performing downlink joint beam nulling according to the beam nulling weight.

11. The method of claim 10, further comprising:

after sending the feature signal to the first base station in the downlink direction at the resource location, receiving signal power sent by the collaborative apparatus, with the signal power being signal power of the feature signal received by the first base station; and in response to receiving at least two pieces of signal power, determining an interfered base station according to the signal power, with the interfered base station being one of first base stations; and correcting, in response to receiving the channel characteristic parameter sent by the collaborative apparatus, the weight of the service User Equipment beam of the interfering cell of the second base station according to the channel characteristic parameter to generate the beam nulling weight comprises:

in response to receiving at least two channel characteristic parameters sent by the collaborative apparatus, determining the channel characteristic parameter used for interference suppression from the at least two channel characteristic parameters, with the channel characteristic parameter used for interference suppression being a channel characteristic parameter sent by the interfered base station through the collaborative apparatus; and correcting the weight of the service User Equipment beam of the interfering cell of the second base station according to the channel characteristic parameter used for interference suppression to generate the beam nulling weight.

12. The method of claim 9, wherein sending the feature signal to the first base station in the downlink direction at the resource location via each port of the second base station comprises:

determining a time domain and a frequency domain corresponding to each port of the second base station according to a preset mapping relationship; and sending the feature signal to the first base station in the downlink direction at the resource location via each port of the second base station according to the corresponding time domain and the corresponding frequency domain.

13. The method of claim 12, wherein the resource location comprises a first resource location and a second resource location, and sending the feature signal to the first base station in the downlink direction at the resource location comprises:

respectively sending the feature signal to the first base station in the downlink direction at the first resource location and at the second resource location.

14. The method of claim 12, wherein a number of ports of the second base station is equal to a number of antennas of the second base station, and the ports of the second base station are in one-to-one correspondence with the antennas of the second base station; or the number of the ports of the second base station is equal to the number of the antennas of the second base station plus 1, the second base station comprises first ports and one second port, the first ports are in one-to-one correspondence with the antennas of the second base station, and the second port corresponds to a plurality of antennas of the second base station.

15. The method of claim 12, wherein the mapping relationship comprises a first mapping relationship or a second mapping relationship, the first mapping relationship is a mapping relationship among ports of the second base station, time domains, and frequency domains, and the second mapping relationship is a mapping relationship among the ports of the second base station, Code Division Multiplexing (CDM) groups, the time domains, and the frequency domains.

16. The method of claim 9, wherein the feature signal comprises a Pseudo-Noise (PN) sequence or a Zadoff-Chu (ZC) sequence.

17. A base station, comprising:

at least one processor; and a storage device having at least one computer program stored thereon;

when the at least one computer is executed by the at least one processor, the at least one processor is caused to implement the cross interference positioning method of claim 9.

18. A cross interference positioning method applied to a collaborative apparatus configured therein with a first base station, a plurality of second base stations, and a resource location, a transmission order, and a transmission period of a feature signal for each of the second base stations, the resource location comprising at least one a time domain resource location or a frequency domain resource location, the first base station being a suspected interfered base station, the second base stations being suspected interfering base stations corresponding to the first base station, and the method comprising:

according to the transmission order and the transmission period, sending a feature signal transmission notification carrying the resource location to each of the second base stations, with the feature signal transmission notification configured to instruct each of the second base stations to generate a feature signal and send the feature signal in a downlink direction at the resource location via each port of each of the second base stations; and sending a feature signal detection notification carrying the resource location to the first base station, with the feature signal detection notification configured to instruct the first base station to perform detection of the feature signal at the resource location.

19. The method of claim 18, further comprising:

after sending the feature signal detection notification carrying the resource location to the first base station, determining, in response to receiving a channel characteristic parameter and the resource location sent by the first base station, an interfering base station according to the resource location, the transmission order, and the transmission period, and sending the channel characteristic parameter to the interfering base station; and in response to receiving signal power sent by the first base station, sending the signal power to the interfering base station, wherein the signal power is signal power of the feature signal received by the first base station.

20. A collaborative apparatus, comprising:

at least one processor, and a storage device having at least one computer program stored thereon;

when the at least one computer program is executed by the at least one processor, the at least one processor is caused to implement the cross interference positioning method of claim 18.

* * * * *